June 1, 1965 F. P. BUNDY 3,186,835

HIGH DENSITY GERMANIUM

Filed July 30, 1962

2 Sheets-Sheet 1

Inventor:
Francis P. Bundy,
by James J. Lichiello
His Attorney.

Inventor:
Francis P. Bundy,
by James J. Lichiello
His Attorney.

④ United States Patent Office 3,186,835
Patented June 1, 1965

3,186,835
HIGH DENSITY GERMANIUM
Francis P. Bundy, Scotia, N.Y., assignor to General Electric Company, a corporation of New York
Filed July 30, 1962, Ser. No. 213,457
5 Claims. (Cl. 75—134)

This invention relates to a higher density form of germanium and more particularly to a stable form of germanium having a density significantly above the ordinary form which has a density of from about 5.36 grams/cm.$^3$ to 5.46 grams/cm.$^3$ at 25° C.

Germanium is a group IV element of the periodic table of elements, having a diamond (cubic) structure with a lattice constant of 5.657 A. Its intrinsic electrical resistivity is about 47 ohm cm. at 25° C. A more complete description of this element is found in "An Introduction to Semiconductors," by W. Crawford Dunlap, Jr., 1957, John Wiley & Sons Inc., New York, N.Y., Chapter II, Library of Congress Catalog Card Number 56-8691. The density of the ordinary form of germanium lies in the range of about 5.36 grams/cm.$^3$ to 5.46 grams/cm.$^3$ at 25° C. Handbook values are about 5.38 grams/cm.$^3$ for high purity single crystal germanium and about 5.46 grams/cm.$^3$ for polycrystalline germanium.

Germanium is basically a poor electrical conductor but by well known doping processes may be converted to a semiconductor of n- or p-type. As such, germanium finds wide applications as semiconductors generally, rectifiers, diodes, etc. However, the useful electrical characteristics of germanium are limited by or dependent on doping processes, and the ordinary physical characteristics are more limiting for various applications because of other more economical and readily available materials.

Accordingly, it is an object of this invention to provide a new form of germanium.

It is another object of this invention to provide a new, high density form of germanium.

It is a further object of this invention to change the physical and electrical properties of germanium.

It is another object of this invention to provide a high density form of germanium which is useful as a control element by means of its physical and/or its altered electrical properties.

It has been discovered that the mentioned limitations on the uses of germanium may be modified by changing the unit cell structure of germanium so that not only different electrical characteristics are provided, but also different physical characteristics are obtained which extend the use of germanium to other than electrical applications.

Briefly described, this invention in one form comprises subjecting a lower density germanium to very high pressures to cause a transition of the germanium to a stable higher density form of germanium.

This invention will be better understood when taken in connection with the following description and drawing in which.

The practice of this invention requires a pressure of the order of 120 kilobars and greater. Pressure apparatuses are available in the art which will provide these and higher pressures. One preferred apparatus is the belt apparatus as described and claimed in U.S. Patent 2,941,248—Hall and a particular use of this type apparatus is described and claimed in U.S. Patent 2,947,610—Hall et al. The aforementioned belt apparatus in 2,941,-248—Hall has been modified to attain higher pressures as described and claimed in copending application S.N. 214,793—Bundy, filed July 30, 1962, and assigned to the same assignee as the present invention. The modified belt apparatus is one preferred apparatus employed to practice this invention. Accordingly, the mentioned modified apparatus is illustrated in FIG. 1.

Figure 1:
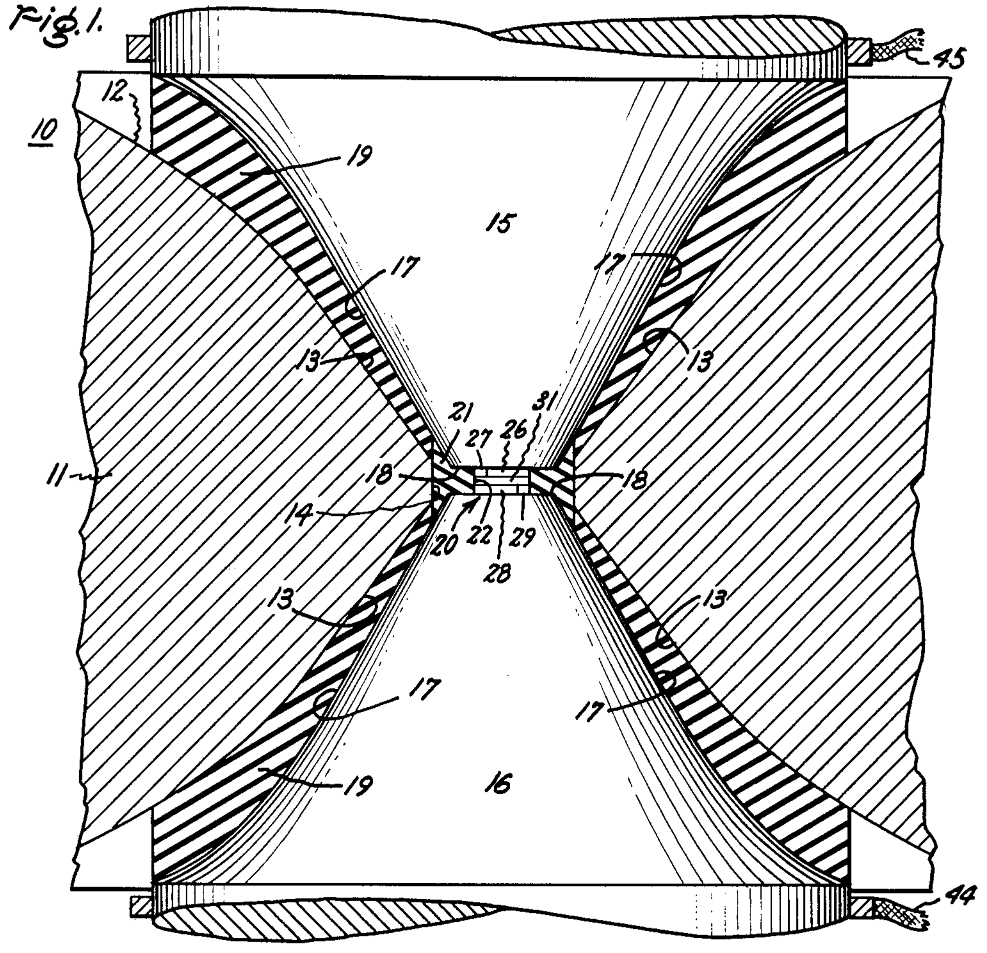
FIG. 1 is an illustration of one preferred high pressure apparatus utilized in the practice of this invention.

Referring now to FIG. 1, apparatus 10 includes an annular die member 11 having a convergent divergent aperture 12 therethrough and surrounded by a plurality of hard steel binding rings (not shown) for support purposes. One satisfactory material for die member 11 is Carboloy cemented carbide grade 55A. Modification of the die member 11 includes tapered surfaces 13 having an angle of about 52.2° with the horizontal, and a generally right circular cylindrical chamber 14 of 0.200 inch diameter.

A pair of tapered or frustoconical punches 15 and 16 of about 1.0 inch O.D. at their bases are oppositely positioned with respect to each other and concentric with aperture 12 to define a reaction chamber therewith. These punches also utilize a plurality of hard steel binding rings (not shown), for support purposes. One satisfactory material for punches 15 and 16 is Carboloy cemented carbide grade 883. Modification of the punches includes tapering of flank surfaces 17 to a 60° included angle to provide faces 18 of 0.150 inch diameter, and with the tapered portions of the punches being about 0.560 inch in the axial dimension. The combination of the 60° included angle and the 52.2° angle of the tapered surfaces 13 provides a wedge shaped gasket opening therebetween.

A further modification relates to sealing means. Sealing or gasketing is provided by means of single gaskets 19 of pyrophyllite. Gaskets 19 between the punches 15 and 16 and die member 11 have walls, which are wedge-shaped in cross section, to fit the defined space and of sufficient thickness to establish a distance of 0.060 inch between punch faces 18.

The essential features incorporated by the modifications which provide the apparatus with a capability of reaching very high pressures in the range of 100 to 200 kilobars and above, relate to ratios of certain given dimensions. These dimensions are, (1) the diameter of the punch face portion 18, (2) the distance between the punch face portions 18 in the initial position as illustrated in FIG. 1, before compression, and (3) the slant height of the gasket 19 along the flank or tapered portion 17 of the punches. In operative working examples of the apparatus of this invention, the ratio of the gap, G, or distance between punch faces 18, to the diameter, D, of the face portion 18, is less than about 2.0, preferably below about 1.75. The slant length, L, of gasket 19 as predicated upon the diameter of the face portion 18 is 6 times D, $L/D=6$. These values are compared to those of U.S. Patent 2,941,248—Hall, which are generally $$\frac{G}{D}=2.0$$

and $L/D$ is less than about 1. These preferred ratios provide a greater amount of lateral support for the punches 15 and 16 without extensively increasing the required component of applied force necessary to compress the gasket for pressure rise in the reaction vessel.

A reaction vessel 20 is positioned between the punch faces 18. In this instance one operative exemplary reaction vessel 20 includes a cylindrical or spool shaped pyrophyllite sample holder 21 having a central aperture 22 therethrough. The parts to be positioned in aperture 22 in their operative relationship are more clearly illustrated in FIG. 2 without sample holder 21. Reaction vessel 20 includes both the sample material and its heating means, in the form of a solid right circular cylinder comprising three coaxially adjacent disc assemblies 23, 24, and 25. Disc assembly 23 includes a larger (¾) segmental portion 26 of pyrophyllite, and a smaller (¼) segmental portion 27 of graphite for electrical conducting purposes. Disc assembly 25 also includes a larger (¾) segmental portion 28 of pyrophyllite, and a smaller (¼) segmental portion 29 of graphite for electrical conducting purposes. Disc assembly 24 includes a pair of spaced apart segmental portions 30, and 31 (FIG. 3) of pyrophyllite with a bar form of germanium sample 32 therebetween. Germanium sample 32 is about 0.020 inch thick by 0.025 inch wide by 0.080 inch long. Each disc assembly 23, 24, and 25 is 0.080 inch diameter by 0.020 inch thick.

Figures 2, 3, 4, 5:
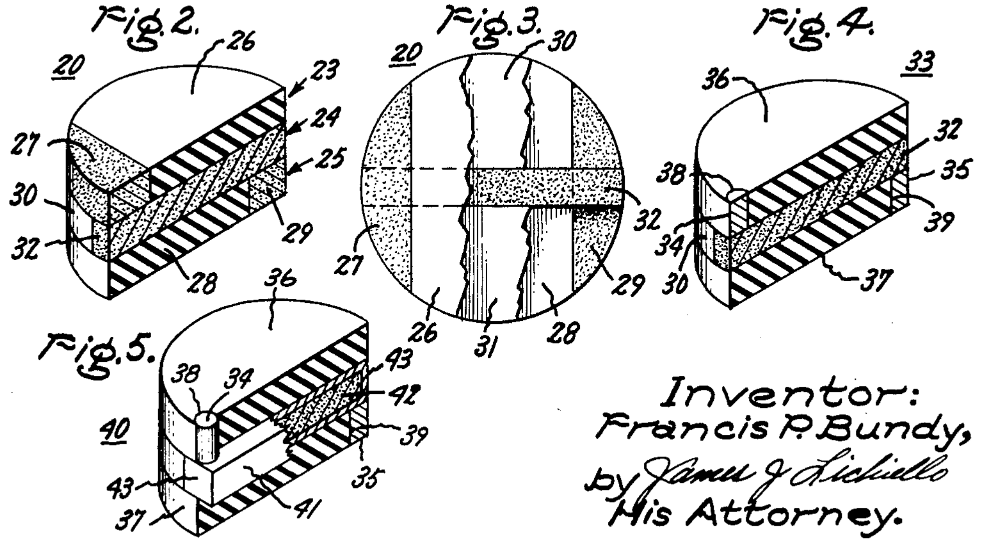
FIG. 2 is an enlarged view of a reaction vessel utilized in the apparatus of FIG. 1.
FIG. 3 is a cutaway sectional view of the reaction vessel of FIG. 2 illustrating the various parts in their operative relationship.
FIG. 4 is a modified reaction vessel which may be utilized in the apparatus of FIG. 1.
FIG. 5 is an illustration of a further modified reaction vessel.

FIG. 3 illustrates the reaction vessel of FIG. 2 in a top cutaway view for more specific clarification of the operative relationship. From either FIG. 2 or FIG. 3, it can be seen that an electrical circuit is established from graphite segment electrode 27 through germanium sample 32 to graphite segment electrode 29 for electrical resistance heating of the sample 32. In the practice of this invention copper electrodes have also been utilized instead of graphite electrodes 27 and 29.

In FIG. 4 reaction vessel 33 is a modification of the reaction vessel of FIGS. 2 and 3. Basically the only change is that wire or rod electrodes 34 and 35 are employed instead of segmental electrodes 27 and 29. Accordingly, pyrophyllite discs 36 and 37 are utilized as the top and bottom disc of the assembly. Each disc 36 and 37 is provided with a tangential opening 38 and 39 in the circumference thereof and wire or rod electrodes 34 and 35 are inserted in these openings respectively. These electrodes 34 and 35 are of wire of about 0.025 inch thick, with both copper and molybdenum wires being utilized in the practice of this invention.

In FIG. 5 reaction vessel 40 is a modification of the reaction vessel 30 of FIG. 4, and which may be employed where the sample material, germanium, may become molten. In such instances, the molten germanium must be more particularly contained to facilitate recovery, prevent loss, and to avoid reaction with the surrounding materials. Accordingly, in the reaction vessel 40 of FIG. 5 a 0.030 inch diameter tube of titanium for example, having a wall thickness of 0.003 inch contains a wire sample 42 of germanium. This composite is then formed into a cylinder 41 having a rectangular cross section of 0.026 inch square. In cutting the composite to the desired length, end flaps 43 are left integral with the tube to be bent to form end panels.

In the practice of this invention apparatus 10 is assembled with one of the reaction vessels as described and subjected to a pressure in the range of about 100 kilobars. Operation of apparatus 10 includes placing the apparatus as illustrated between the platens of a suitable press and causing punches 15 and 16 to move towards each other, thus compressing the reaction vessel and subjecting a sample such as 32 and 42 to high pressures.

To calibrate the apparatus for high pressures, the calibration technique as given in U.S. Patents 2,941,248—Hall and 2,947,610—Hall et al. may be employed. This technique includes subjecting certain metals to known pressures where an electrical phase transition of these materials is indicated. For example, during the compression of iron a definite reversible electrical resistance change will be noted at about 130 kilobars. By the same token then, an electrical resistance change in iron denotes 130 kilobars pressure.

The following table is indicative of the metals employed in the calibration of the belt apparatus as described:

TABLE I

| Metal: | Transition pressure (kilobars) |
|---|---|
| Bismuth I[1] | 25 |
| Thallium | 37 |
| Cesium | 42 |
| Barium I[1] | 59 |
| Bismuth III | 89 |
| Iron | 130 |
| Barium II | 141 |
| Lead | 161 |
| Rubidium | 193 |

[1] Since some metals indicate several transitions with increasing pressure, the Roman numerals indicate the transition utilized, in sequential order.

A more particular description of methods employed to determine the above transition values may be found in the publication (1) "Calibration Techniques in Ultra High Pressures," F. P. Bundy, Journal of Engineering for Industry, May 1961; Transactions of the ASME, Series B, (2) Proceedings of the American Academy of Arts and Science, P. W. Bridgman, vol. 74, page 425, 1942, vol. 76, page 1, 1945, and vol. 76, page 55, 1948. The Bridgman values were later corrected to their present values, as given in the above table, by R. A. Fitch, T. F. Slykhouse, H. G. Drickamer, "Journal of Optical Society of America," vol. 47, No. 11, pages 1015–1017, November 1957, and A. S. Balchan and H. G. Drickamer, "Review of Scientific Instruments," vol. 32, No. 3, pages 308–313, March 1961. By utilizing the electrical resistance changes of the metals as given, a press is suitably calibrated to provide a reading for the approximate pressure within the reaction vessel.

Where desirable, a sample such as sample 32 may be subjected to high temperatures by electrical resistance heating. The current path includes connecting a source of power (not shown) to each punch 15 and 16 by electrodes 43 and 44 so that the current flow is through for example punch 15 to electrode 27, through sample 32 and electrode 29 to punch 16. Additionally, this circuit is also utilized to measure the resistance or change of resistance of the sample. For example, connecting a voltmeter across punches 15 and 16, at conductors 45 and 44, and a current meter in series with conductor 45 will provide, by calculation, measurements of heating power, initial and final resistance of the sample, and also changes of resistance with application of pressure or high temperature. Alternatively, a resistance meter or bridge may be connected directly to electrodes 45 and 44.

Other forms of heating both external and internal types may also be provided. For example, the electrical discharge or flash heating method as described in the aforementioned copending application S.N. 191,914 may also be employed. This method includes the rapid discharge (0–5 milliseconds) of an electrolytic capacitor circuit through the sample 32. Other forms of heating may include a thermite or chemical reaction adjacent a given sample, or the application of electrical wave energy.

When utilizing small currents for resistance measurements only, a small battery may be employed as a source of power. For heating purposes a larger amount of power is required which is conveniently regulated by means of a variable transformer. Such a transformer may be adjusted to supply less than about 1 watt for the resistance measurements at ambient temperatures.

Figure 6:
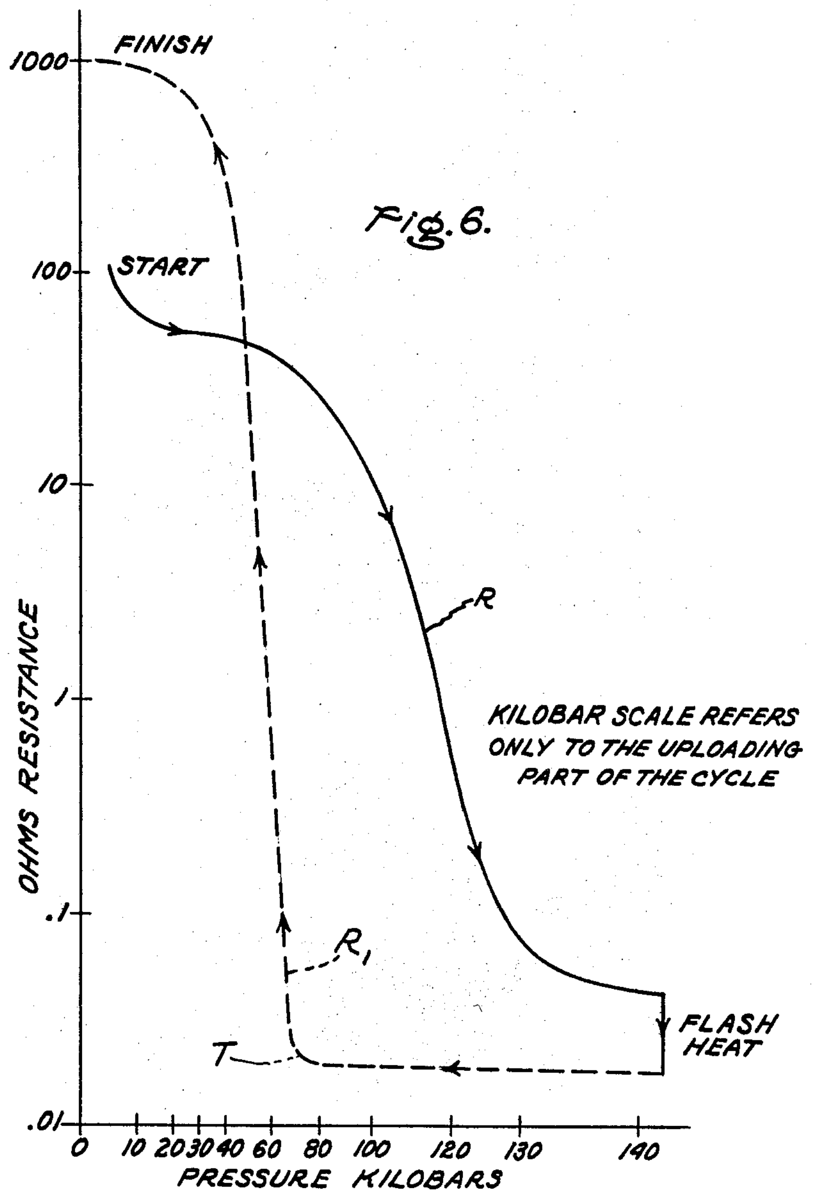
FIG. 6 is a curve illustrating change in resistance of a germanium sample undergoing transition to the more dense form.

In one exemplary practice of this invention, reaction vessel 20 was assembled utilizing high purity transistor grade single crystal germanium as sample 32. Sample density was about 5.36 grams/cm.$^3$ and its measured electrical resistance was about 100 ohms. Reaction vessel 20 was then placed in the apparatus 10 of FIG. 1 and apparatus 10 was placed between the platens of a hydraulic press of 200 ton capacity. Pressure in the sample was increased slowly over about a period of about 5 minutes. As illustrated in FIG. 6, the solid portion of resistance curve R shows a decrease with increasing pressure. In this exemplary process resistances above about 20 ohms were measured by an ordinary Simpson meter. For resistances lower than about 20 ohms a Kelvin double bridge was employed. The resistance of the sample decreased as pressure increased, with the slope of the resistance curve being steepest at about 100 to 120 kilobars and with a minimum resistance reading of about 0.04 ohm at about 140 kilobars and higher. Although unnecessary for the transition, at about 140 kilobars this particular sample was flash heated as shown by the vertical drop in resistance. Upon decreasing the pressure as shown by the dash portion of curve R, the sample resistance increased until room pressure was reached. However, at this point the resistance was about 1000 ohms or about 900 ohms higher than the initial resistance.

Upon removal of the reaction vessel it was noted that the sample was smaller in size than the original, i.e., there was a noticeable reduction in height but no apparent change in the other dimensions indicating an increase in the density of the sample. Comparative measurements of the changes in dimension between the initial sample and the ultimately recovered sample of higher density form germanium (germanium III) resulted in a calculated density of 5.7 to 6.1 grams/cm.$^3$. A density test was conducted utilizing the techniques of the well known sink or float method which verified the increase in density. The values obtained ranged between 5.86 and 5.90 grams/cm.$^3$.

The above sample was also submitted to X-ray analysis and was found to have a tetragonal crystal structure with a unit cell of 12 atoms and $a_0=5.93$ A. and $c_0=6.98$ A. at 25° C. The calculated theoretical density from X-ray analysis is 5.9 grams/cm.$^3$ at 25° C. The material was also found to have been converted from the single crystal starting material to polycrystalline.

A high density sample was connected into an electrical circuit at liquid nitrogen temperature to ascertain its resistance with rising temperatures. It was found that the material has a negative coefficient of resistivity and is thus a semiconductor.

The more dense forms of given materials are usually followed by a Roman numeral designating their particular phase. For example, bismuth transitions are denoted as bismuth I, bismuth II, bismuth III, etc. In the practice of this invention the original sample is denoted as germanium I, i.e., having a density in the range of 5.36 to 5.46 grams/cm.$^3$ at 25° C. This sample is subjected to high pressures in the apparatus as described with resistance readings being recorded at various pressures on the uploading cycle and at various positions on the unloading cycle. A typical resistance curve of such cycles is illustrated in FIG. 6.

Referring to FIG. 6, curve R is the resistance curve for a germanium I sample material. A transition occurs at a minimum pressure of about 120 kilobars. It is in this range where the electrical resistance curve is decreasing more steeply. Certain effects taken into consideration to determine minimum transition pressure relate to the reduction in volume of the sample during transition requiring the punches to move or be moved more deeply into the reaction chamber, and the effect of temperature rise in the various materials in the reaction chamber.

This transition is believed to be that which provides germanium II, for example in the range of 120 to 140 kilobars or above about 120 kilobars. Thus, at these pressures germanium II exists. After the flash heating (where utilized) the resistance unloading curve $R_1$ (dash line) shows an intitial generally constant resistance to a point T. Because of the pressure or expansion characteristics of the reaction vessel assembly, gaskets, etc., the pressure reading in kilobars is not accurate on the unloading cycle. However, no accuracy is necessary since the point T is a result of unloading and occurs in the unloading cycle. At this point, T in the pressure unloading cycle the resistance curve $R_1$, upon further pressure reduction, rises sharply to above the initial resistance reading of the sample. It is believed that this marked change in resistance indicates a further transition so that the germanium recovered is referred to herein and in the claims as germanium III. In the practice of this invention pressure conditions are carried into the germanium II region for ultimate recovery of germanium III.

The above example was repeated many times with distinguishing variations. For example, the different reaction vessels were employed with the different material electrodes as described. These variations did not markedly affect the process or the product of this invention. No particular effects were noted in varying the unloading time.

The electrical circuits as described were also utilized to acquire a temperature rise in the sample. It was found that temperatures up to and beyond the melting point of germanium had no marked effect on the product or on the transition pressure. Increased temperatures are therefore unnecessary.

The following Table II is indicative of a number of examples of this invention. All measurements were made at about 25° C.

TABLE II

| Ex. No. | Reaction vessel | Max. pres., kilobars | Max. input heating power, watts | Initial resistance, ohms | Final resistance, ohms | Final density, g./cm.$^3$ |
|---|---|---|---|---|---|---|
| 1 | Fig. 2 | 140 | 80V 0.0045F flash heat | 100 | 1,000 | 5.90±.02 (X-ray). |
| 2 | Fig. 2 | 135 | Eight 40V 0.0045F flash heats. | 200 | 2.4 | 5.90±.02 (X-ray). |
| 3 | Fig. 2 | 140 | None | 80 | (1,000) 350 | 5.90±.02 (X-ray). |
| 4 | Fig. 4 without electrodes. | 140 | do | | | 5.74 to 6.48 by wt. and dimensions. |
| 5 | do | 140 | do | | | 6.05±.20 by wt. and vol. |
| 6 | do | 130 | do | | | 6.7±.8 by vol. change. |
| 7 | do | 140 | do | | | 5.86 by buoyancy method. |
| 8 | do | 140 | do | | | 5.90 by buoyancy method. |
| 9 | Fig. 5 | 135 | 111 | 0.107 | 0.013 | Slightly less than 5.90 (X-ray). |
| 10 | Fig. 5 | 135 | 123 | 0.032 | 0.0096 | Not meas. |
| 11 | Fig. 5 | 135 | 122 | 0.016 | 0.0067 | Not meas. |
| 12 | Fig. 5 | 140 | 126 | 0.028 | 0.0081 | Not meas. |
| 13 | Fig. 5 | 135 | 121 | 0.030 | 0.0133 | Not meas. |
| 14 | Fig. 4 | 135 | 135 | >46 | 1,150 | Approx. 6.0 by wt. and vol. |
| 15 | Fig. 5 | 125 | 120 | 0.067 | 0.011 | Not meas. |

From the above examples it may be seen that a new higher density form of germanium is provided by subjecting the ordinary form of germanium of a theoretical density in the range of about 5.36 grams/cm.$^3$ to 5.46 grams/cm.$^3$ or of less density to high pressures above about 100–120 kilobars. The recovered germanium has a density of greater than about 5.7 grams/cm.$^3$. In all instances the density of the sample is significantly increased over the measured or known density of the starting material. The starting material, however, may not be completely converted to the high density form. Several examples were subjected to maximum pressures below about 125 kilobars and only partial conversion was noted. In those examples where maximum pressures were between about 125 to 190 kilobars substantially complete conversion was indicated.

The starting material may be single crystal or polycrystalline with a wide range of impurities. Other materials may also be combined with germanium to provide different compositions of matter or alloys containing germanium III. As a further example, a germanium sample including about 0.6 atomic weight percent silicon also underwent transition to the higher density germanium. It was noted that in this instance the final resistance of the sample was about the same as the initial resistance. X-ray analysis verified the high density form.

A further starting material comprised 50 atomic weight percent germanium and 50 atomic weight percent silicon. This material also underwent transition to a higher density. The final resistance of the sample was about 0.5 ohms compared to the original resistance of 400 ohms. X-ray analysis indicated both the high density form of silicon and the high density form of germanium to be present together with an alloy medium. High density silicon is the subject of copending application S.N. 213,458 Wentorf et al., filed concurrently herewith and assigned to the same assignee as the present invention. Briefly, high density silicon is provided by subjecting silicon of ordinary density, i.e., 2.33 grams/cm.$^3$ to 2.42 grams/cm.$^3$ at 25° C. to high pressures greater than about 110 kilobars. The recovered silicon has a density greater than the original density of the starting silicon and in the range greater than about 2.4 grams/cm.$^3$. This silicon is referred to as silicon II.

A sample of the high density germanium of this invention was connected into an electrical circuit for resistance readings at various temperatures such as, room temperature, ice temperature (0° C.), Dry Ice temperature (about −78.5° C.) and liquid nitrogen temperature (about −105.8° C.). It was found that the resistance increased sharply with the lower temperatures with the final reading at liquid nitrogen temperature being increased by a factor of $10^5$ over the original reading of 4600 ohms. This indicates a negative temperature coefficient of resistivity and thus the material exhibits semiconductivity characteristics.

When the high density form of germanium is subjected to high temperatures at room temperature it reverts to its original less dense form. For example, when heated at 120° C. for a period of about 8 hours approximately ½ of the material reverts. When heated at 200° C. for about 6 hours substantially complete reversion takes place.

The high density form of germanium may also be uilized as an electrical resistor because of its increased electrical resistance or as an energy storage means because of its expansion characteristics when exposed to elevated temperatures. The dense form of germanium may be a control element or sensing element since the change to the less dense form is indicative of a high temperature having been reached. As one example the dense form of germanium may be a resistance element in a simple circuit so that at the change or reversion temperature the resistance changes sharply and irreversibly to denote a given temperature being reached. Alternatively, the expansion characteristics inherent in the change to the lower density form may be employed to provide an actuating force at elevated temperatures.

While a specific article and a method for its production in accordance with this invention is described and shown, it is not intended that the invention be limited to the particular description nor to the particular method indicated, and it is intended by the appended claims to cover all modifications within the spirit and scope of this invention.

What I claim as new and desire to securve by Letters Patent of the United States is:

1. A dense semiconducting form of germanium stable at temperatures below about 120° C. having a density significantly greater than ordinary germanium said dense form being of density between about 5.7 grams/cm.$^3$ to 6.1 grams/cm.$^3$ at 25° C. and having a tetragonal unit cell of 12 atoms and $C=6.98$ A. and $a_0=5.93$ A.

2. An alloy consisting essentially of germanium III and silicon where the density of the germanium III is greater than the density of germanium I.

3. An alloy consisting essentially of germanium III and silicon II where the density of the silicon II is greater than the density of silicon I.

4. A method of providing a form of germanium stable at temperatures below about 120° C. and having a density of at least about 5.7 grams/cm.$^3$ at 25° C. which comprises subjecting germanium of a density between about 5.36 grams/cm.$^3$ to 5.46 grams/cm.$^3$ at 25° C. to pressures in the range of from about 110 to about 190 kilobars to cause a change of phase in the germanium in said sample, reducing the said pressure and recovering a high density form of germanium.

5. The invention as recited in claim 4 where the temperature of said germanium is raised above about 25° C. during the transition process.

References Cited by the Examiner

UNITED STATES PATENTS

| | | | |
|---|---|---|---|
| 2,941,247 | 6/60 | Bundy | 18—16.5 |
| 2,947,609 | 8/60 | Strong | 23—209.1 |
| 2,552,626 | 5/61 | Fisher et al. | 75—134.7 |
| 2,995,776 | 8/61 | Giardini et al. | 18—16.5 |

OTHER REFERENCES

Physics and Chemistry of Solids, vol. 23, pp. 321–323 and 451–456, Pergammon Press, 1962.

Journal of Metals, vol. 9, July 1957, pp. 813–818.

Physical Rev., vol. 94, June 1954, pp. 1128–1133.

DAVID L. RECK, *Primary Examiner.*